(12) United States Patent  
Smith et al.

(10) Patent No.: US 9,131,271 B2  
(45) Date of Patent: Sep. 8, 2015

(54) SYSTEMS AND METHODS FOR REAL-TIME ADAPTATION OF MULTIMEDIA DATA

(71) Applicants: Greg Smith, Flower Mound, TX (US); Donald Bisdorf, Ann Arbor, MI (US); Matthew Szatmary, Ypsilanti, MI (US); Jeremiah Condon, Trenton, MI (US)

(72) Inventors: Greg Smith, Flower Mound, TX (US); Donald Bisdorf, Ann Arbor, MI (US); Matthew Szatmary, Ypsilanti, MI (US); Jeremiah Condon, Trenton, MI (US)

(73) Assignee: Connected Lyfe, South Jordan, UT (US)

( * ) Notice: Subject to any disclaimer, the term of this patent is extended or adjusted under 35 U.S.C. 154(b) by 273 days.

(21) Appl. No.: 13/668,072

(22) Filed: Nov. 2, 2012

(65) Prior Publication Data

US 2013/0111058 A1    May 2, 2013

Related U.S. Application Data

(60) Provisional application No. 61/554,533, filed on Nov. 2, 2011.

(51) Int. Cl.

| | |
|---|---|
| *G06F 15/16* | (2006.01) |
| *H04N 21/44* | (2011.01) |
| *H04N 21/442* | (2011.01) |
| *H04N 21/462* | (2011.01) |
| *H04L 29/06* | (2006.01) |
| *H04N 21/4143* | (2011.01) |

(52) U.S. Cl.  
CPC ........ *H04N 21/44016* (2013.01); *H04L 65/602* (2013.01); *H04L 65/80* (2013.01); *H04N 21/44209* (2013.01); *H04N 21/4622* (2013.01); *H04N 21/4143* (2013.01)

(58) Field of Classification Search  
CPC ............................... H04L 47/25; H04L 65/60  
USPC ......... 709/231, 203, 213, 217, 226, 232–233, 709/235–236  
See application file for complete search history.

(56) References Cited

U.S. PATENT DOCUMENTS

| | | | | |
|---|---|---|---|---|
| 6,678,332 | B1* | 1/2004 | Gardere et al. | 375/240.26 |
| 6,763,392 | B1* | 7/2004 | del Val et al. | 709/231 |
| 8,055,785 | B2* | 11/2011 | Liu et al. | 709/231 |
| 8,375,140 | B2* | 2/2013 | Tippin et al. | 709/236 |
| 2002/0087975 | A1* | 7/2002 | Schlack | 725/34 |
| 2005/0281328 | A1* | 12/2005 | Hurst et al. | 375/240 |
| 2012/0324519 | A1* | 12/2012 | Laughlin | 725/95 |

* cited by examiner

*Primary Examiner* — Ruolei Zong  
(74) *Attorney, Agent, or Firm* — Holland & Hart, LLP

(57) ABSTRACT

A computer-implemented method for real-time adaptation of multimedia data. A first multimedia stream is monitored. A determination is made as to whether an attribute of the first multimedia stream satisfies a predefined threshold. When the attribute of the first multimedia stream satisfies the predefined threshold a request is made to a switch from the first multimedia stream to a second multimedia stream. When the data packet from the second multimedia stream is received, transmission of the first multimedia stream is terminated. The data packet from the second multimedia stream is marked as a splicing point. When the value of the timestamp of the data packet from the second multimedia stream is determined in relation to the value of the timestamp of the data packet from the first multimedia stream, transmission of the second multimedia stream is initiated.

22 Claims, 12 Drawing Sheets

SYSTEMS AND METHODS FOR REAL-TIME ADAPTATION OF MULTIMEDIA DATA

RELATED APPLICATIONS

This application claims priority to U.S. Provisional Patent Application Ser. No. 61/554,533, filed Nov. 2, 2011, the entire content of which is incorporated herein by reference.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks including audio/video multimedia. Users of computer technologies continue to demand an increase in the efficiency of multimedia technologies. Improving the efficiency of computer technologies is always desirable to anyone who uses and relies on computers.

Many devices exist for displaying multimedia content. They include television entertainment systems, desktop computers, laptops, tablet computing devices, handheld computing devices, Smartphones, and the like. Multimedia systems may allow a user to play multimedia data on the multimedia device. When a provider attempts to deliver multimedia data to a consumer across a network, but the provider is unable to ensure constant network performance, and is unable to dictate the specifications of the user's playback device, it becomes challenging to provide the consumer with a continuous and uninterrupted multimedia experience.

SUMMARY

According to at least one embodiment, a computer-implemented method for switching between multimedia streams in real-time is described. A first multimedia stream is monitored. A determination is made as to whether an attribute of the first multimedia stream satisfies a predefined threshold. When the attribute of the first multimedia stream satisfies the predefined threshold a request is made to a switch from the first multimedia stream to a second multimedia stream.

Upon receiving the data packet from the second multimedia stream, transmission of the first multimedia stream may be terminated. The data packet from the second multimedia stream may be marked as a splicing point. Transmission of the second multimedia stream may be initiated in response to the value of the timestamp of the data packet from the second multimedia stream in relation to the value of the timestamp of the data packet from the first multimedia stream. A timestamp of a data packet of the first multimedia stream may be compared to a timestamp of a data packet of the second multimedia stream.

In one embodiment, one or more data packets from the first multimedia stream may be transmitted at a first data rate. The actual data rate of the first multimedia stream may be lower than the first data rate. A port associated with the second multimedia stream may be monitored. At least a portion of the second multimedia stream may be stored before receiving a last data packet from the first multimedia stream. The portion of the second multimedia stream may be processed after receiving the last data packet from the first multimedia stream.

In one configuration, a synchronization level between the first and second multimedia streams may be monitored. Upon determining that the synchronization level satisfies the predefined synchronization threshold, an alert may be sent.

In one embodiment, historical data loss statistics may be stored. A type of data loss may be determined based at least in part on the stored historical data loss statistics.

Upon receiving a request to switch from the first multimedia stream to the second multimedia stream, a warning message may be sent.

A first multimedia stream may be sent to a first client. A second multimedia stream may be sent to a second client. The second client consuming the second multimedia stream may be switched from the second multimedia stream to the first multimedia stream consumed by the first client. The first and second clients may consume the first stream concurrently. Upon determining the second client is switched to the first multimedia stream, the second multimedia stream may be terminated. Additionally, a third multimedia stream may be sent and consumed by both a first client and to a second client. Upon determining that an attribute of the third multimedia stream satisfies a predefined splitting threshold, the second client may be switched to a fourth multimedia stream.

A computer system configured to diagnose a network configuration is also described. The system may include a processor and memory in electronic communication with the processor. The memory may store instructions that are executable by the processor to monitor a first multimedia stream, determine whether an attribute of the first multimedia stream satisfies a predefined threshold, and upon determining that the attribute of the first multimedia stream satisfies the predefined threshold, request a switch from the first multimedia stream to a second multimedia stream. When the data packet from the second multimedia stream is received, the memory may store instructions that are executable by the processor to terminate transmission of the first multimedia stream. The data packet from the second multimedia stream is marked as a splicing point. When the value of the timestamp of the data packet from the second multimedia stream is determined in relation to the value of the timestamp of the data packet from the first multimedia stream, the memory may store instructions that are executable by the processor to initiate transmission of the second multimedia stream.

A computer-program product for switching between multimedia streams is also described. The computer-program product may include a non-transitory computer-readable medium storing instructions thereon. The instructions may be executable by a processor to monitor a first multimedia stream. Additionally, the instructions may be executable by a processor to determine whether an attribute of the first multimedia stream satisfies a predefined threshold. Upon determining that the attribute of the first multimedia stream satisfies the predefined threshold the instructions may be further executable by the processor to request a switch from the first multimedia stream to a second multimedia stream. When the data packet from the second multimedia stream is received, the instructions may be executable by a processor to terminate transmission of the first multimedia stream. The data packet from the second multimedia stream is marked as a splicing point. When the value of the timestamp of the data packet from the second multimedia stream is determined in relation to the value of the timestamp of the data packet from the first multimedia stream, the instructions may be executable by a processor to initiate transmission of the second multimedia stream.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
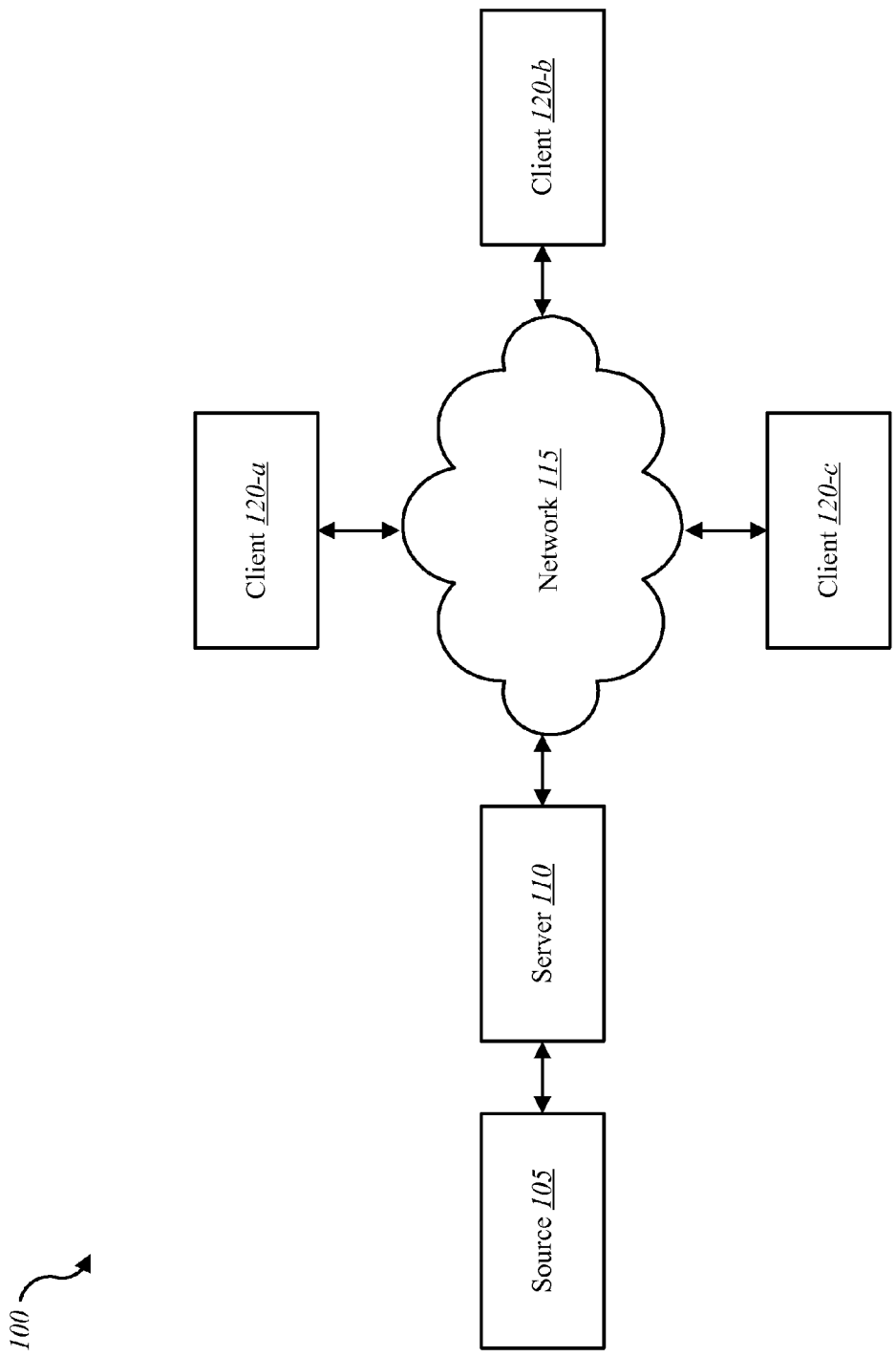
FIG. 1 depicts a block diagram of a computer system suitable for implementing the present systems and methods.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The Transmission Control Protocol (TCP) is a protocol to provide lossless transmission of data across an Internet Protocol (IP) network. Furthermore, the protocol provides that data packets will arrive at the destination in the same order in which they were transmitted. However, the protocol does not provide the timely arrival of data, which may result in delays that may be unacceptable for the purposes of continuous playback. The User Datagram Protocol (UDP) may produce much quicker transmission of data, but does not guarantee the arrival of data, and does not guarantee that data packets will arrive in the same order in which they were transmitted.

When using a lossy protocol such as UDP, it is possible to transmit redundant data, so that even when some data is lost, the consumer has a better chance of receiving a complete set of the original data. Mathematical algorithms such as forward error correction (FEC) allow a provider to minimize the amount of redundant data necessary to guarantee that the client will receive the complete original data. However, a sufficiently high percentage of lost data will still result in incomplete data delivery. This percentage depends on the chosen FEC algorithm and parameters.

A reliable method of ensuring smooth and uninterrupted playback is to deliver the consumer a large buffer of data before the consumer begins playback. As the consumer plays back this data, the provider continues to deliver new data, and so the consumer maintains a buffer of data that has not yet been played. When any data is lost or delayed, the consumer can continue to play data from the stored buffer while the consumer waits to receive the missing data. Delivering the entire set of multimedia data before beginning playback is the logical extreme of this method. Any such buffering, however, creates a delay between the time when the consumer wishes to receive playback and the time when playback actually begins. This does not provide an "instant on" experience that consumers are used to from sources such as a traditional television. Also, it may not be possible or even desirable to provide data buffering ahead of time in the case of live content.

In order to increase the likelihood that network congestion will not result in delayed data or lost data, it is possible to encode and compress multimedia data so that less data needs to be transmitted in order to deliver the same content. Transmitting less data reduces network load and improves the chances of timely and error-free delivery. There are many audio/video compression algorithms available (such as H.264), but there is a practical limit as to how far audio/video can be compressed before it is necessary to reduce image or audio quality in order to further reduce data size. Delivering multimedia data at low quality, but high compression, may provide for accurate and timely data delivery, but when a given consumer's network connection is particularly reliable, it may be possible to deliver higher-quality data to that consumer. Providing a balance between network performance and playback quality for all consumers requires the preparation of multiple encodings of the same data, and requires the provider to deliver each consumer the encoding that gives the consumer an improved playback quality for that consumer's network connection.

A system which provides multiple encodings to different consumers is faced with several challenges of its own, the first of which is determining the reliability and capacity of each consumer's network connection. The consumer may be able to determine its own network capacity by monitoring incoming data and measuring the amount of loss and delay experienced, but any such statistics will require a certain amount of time to accumulate, and would not necessarily be available instantly when the consumer wishes to begin receiving multimedia data. Also, these statistics may change over time, depending on other conditions changing within the network, such as competing traffic, hardware issues, signal interference, and so forth.

Hypertext Transfer Protocol (HTTP) adaptive streaming systems attempt to address these issues by storing several different encodings of the same content on a central server. Each encoding is produced at a different compression rate and quality rate, and each encoding is broken up into small segments that cover an identical time period. For instance, a one-minute audio/video file might be encoded at three different bit rates, and each of the encodings might be broken up into six files, each representing ten seconds of the original file. The central server holds these segment files, as well as an index that lists the pertinent details of each file (such as file name, file size, file duration, encoding method, and so forth). Clients can retrieve the index file using a standard HTTP request, and based on the information in the index, clients can choose and request segment files with additional HTTP requests. It is the responsibility of the client to request the segment files in the correct order, and to choose which encoding will provide the desired quality given the client's network and playback capabilities. As with the TCP and UDP protocols, however, use of the HTTP protocol requires redundant transmission of the same data to multiple clients.

IP multicast technology can help to reduce redundant transmission of data by relying on intermediate network nodes to replicate data as necessary. For example, using IP multicast, a server might be able to transmit the same data to ten different intermediate nodes. Each intermediate node might then transmit this data to ten different clients. The result is that the server has delivered the data to one hundred clients, but neither the server nor the intermediate nodes were required to transmit the data more than ten times. Use of IP multicast to serve data to multiple clients requires that all clients be prepared to receive the data at the same time, as transmitted by the provider. Clients cannot request data on their own schedule as with HTTP adaptive streaming systems.

Referring now to the drawings, FIG. 1 depicts a schematic block diagram of one embodiment of a computer system 100, in accordance with various embodiments of the present systems and methods. As depicted, the computer system 100 includes a source 105, a server 110, a network 115, and one or more clients 120. In one embodiment the source 105 may be a multimedia data source. Although the depicted computer system 100 is shown and described herein with certain components and functionality, other embodiments of the computer system 100 may be implemented with fewer or more components or with less or more functionality. For example, some embodiments of the computer system 100 include one or more sources in addition to the depicted source 105. Additionally, some embodiments of the computer system 100 may include one or more networks and servers in addition to the depicted server 110 and network 115. Additionally, some embodiments of the computer system 100 may include similar components arranged in another manner to provide similar functionality, in one or more aspects.

The source 105 may provide multimedia data that is to be transmitted to the clients 120. The multimedia data may be prepared content that is stored statically, or real-time content that is being received from another network location. The source 105 may process the multimedia data to ensure that the multimedia data has certain characteristics. These certain characteristics facilitate switching from one multimedia stream to another multimedia stream. Additionally, the source 105 may provide additional content. The additional content may also include one or more alternate streams with varying bit rates. Additionally, content may be provided by one or more sources in addition to the depicted source 105. In one embodiment, the source 105 performs one or more of the operations involved in switching from one stream to another.

In one embodiment, the source 105 encodes data streams at several different bit rates in order to provide for a variety of levels of quality and stream sizes. The server 110 may transmit these streams to the client 120 in real time as the data is being generated. Alternatively, the server 110 may write this data to static storage at a location where the server 110 can access upon demand. The source 105 may select the method and timeframe for delivery of data to the server 110 based on the requirements for usage of the system 100.

In one embodiment, the source 105 adds splicing points, FEC data, and sequence numbers to each stream. Alternatively, the server 110 the client 120, or both, may add splicing points, FEC data, and sequence numbers to a stream. The source 105 may add a blank area in a data stream to allow the server 110 or the client 120 to add packet sequence numbers. For example, when the system 100 transmits a data stream using MPEG transport streams, the source 105 may reserve a space in the private data area of the transport stream packets to allow the server 110 or the client 120 to insert a sequence number into the reserved space. Additionally, the server 110 may provide FEC data and sequence numbers to allow for the FEC algorithm and parameters to be adjusted in order to meet the requests of several different clients 120.

FEC data may include additional data generated by an FEC algorithm for the purpose of recalculating missing data at a destination device, such as the client 120. In one embodiment, the FEC algorithm implements Reed-Solomon codes. The server 110 may divide multimedia data from the source 105 into network transmission packets, such as UDP packets, and divide these packets into groups of equal size. Working group by group, the server 110 may use the packets of each group as input to the FEC algorithm, which will provide a certain number of error-correction packets. The server 110 may include the error-correction packets in the stream data along with the original network transmission packets. When using MPEG transport streams, the server 110 may include this FEC data in the payload of additional transport stream packets to be sent along with the original multimedia transport stream packets. The transport stream packets containing FEC data may have their own packet ID (PID) to notify the client 120 that the FEC data is not multimedia data. A dummy playback device that can play back multimedia MPEG transport streams, but which is not designed to work specifically with the computer system 100, may not be enabled to recognize the FEC packet ID and so may skip the FEC packets.

The server 110 may include sequence numbers in each network transmission packet. The packets within an FEC packet group (a group of standard multimedia data packets and the packets containing the FEC data for those multimedia packets) may contain unique sequence numbers. The server 110 may guarantee that sequence numbers are unique for a larger number of packets than a single FEC packet group. These sequence numbers identify the positions occupied by the packets in the FEC algorithm. When a packet is lost during transmission, the sequence numbers will inform the client 120 which packets are missing and need to be recalculated. When using MPEG transport streams, the server 110 may include these sequence numbers in the private data area of the transport stream packets.

Splicing points are data markers that identify exact positions in the data streams where it would be possible for the client 120 to stop playing one stream and resume playing another, with no noticeable discontinuity in playback. Splicing points may appear at regular and frequent intervals in each data stream. The timing of the splicing points may be synchronized across the data streams to ensure that the splicing points occur at the same time or within a predefined range of time. The source 105 may provide multimedia streams that are closely time-synchronized with each other. When the source transmits alternative streams based on the same multimedia channel, the transmission may be synchronized so that the same audio/video information from each stream arrives at the server within a predefined window of time. For example, the source 105 may identify where keyframes appear in the transport streams, and may identify transport stream packets that represent the beginning of each chosen keyframe and mark those packets as splicing points. Data from two different streams may then be compared by the source 105, the server 110, the client 120, or any combination of the three to find two packets that are marked as splicing points and that are marked with the same presentation timestamp (PTS). Since the two splicing point packets mark keyframes at the same point in time in both streams, the client 120 may continue to play a first stream up to, but not including, the first stream's splicing point, and then begin to play the second stream starting at the second stream's splicing point. Thus, the multimedia playback appears continuous.

The server 110 retrieves multimedia data from the appropriate source 105 and transmits the data to client 120, as requested by each of the clients. For purposes of smooth playback and uninterrupted stream switching, the server 110 may transmit the stream at its actual bit rate. The server 110 may inspect the characteristics of the multimedia data to ensure the streams are transmitted to the client 120 at their actual bit rates. In one embodiment, the server 110 performs one or more of the operations involved in switching the client 120 from one multimedia stream to another.

The client 120 receives data from the server 110 and plays back multimedia content. In one embodiment, the client 120 ingests the multimedia stream at its actual bit rate. In one embodiment, the client 120 ingests the multimedia stream at a data rate above or below the actual bit rate of the multimedia stream. In one embodiment, the client 120 is configured as an intermediary between the server 110 and a dummy multimedia playback device.

Figure 2:
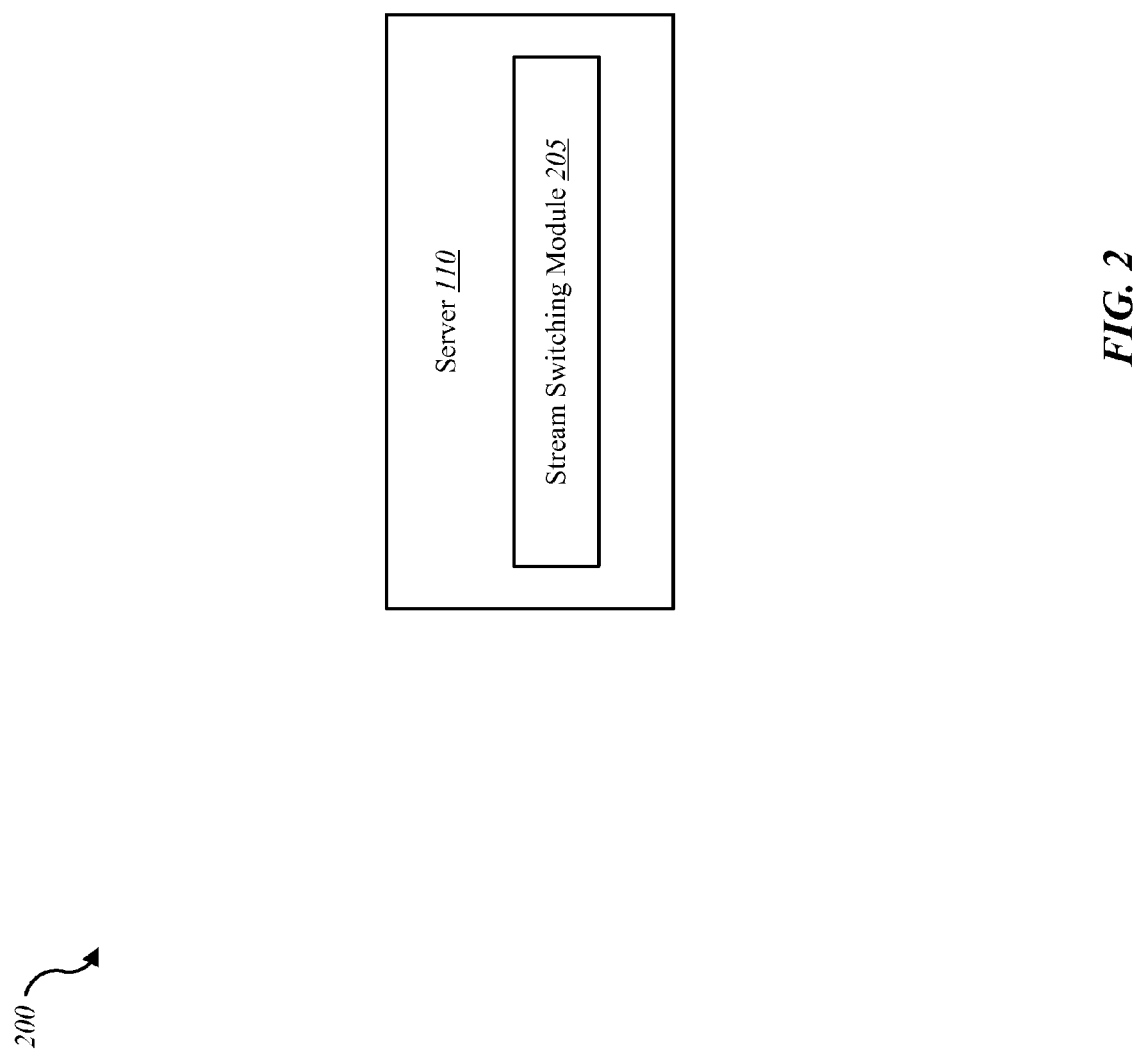
FIG. 2 depicts a block diagram illustrating one embodiment of a server that may be implemented with the present systems and methods.
Figure 4:
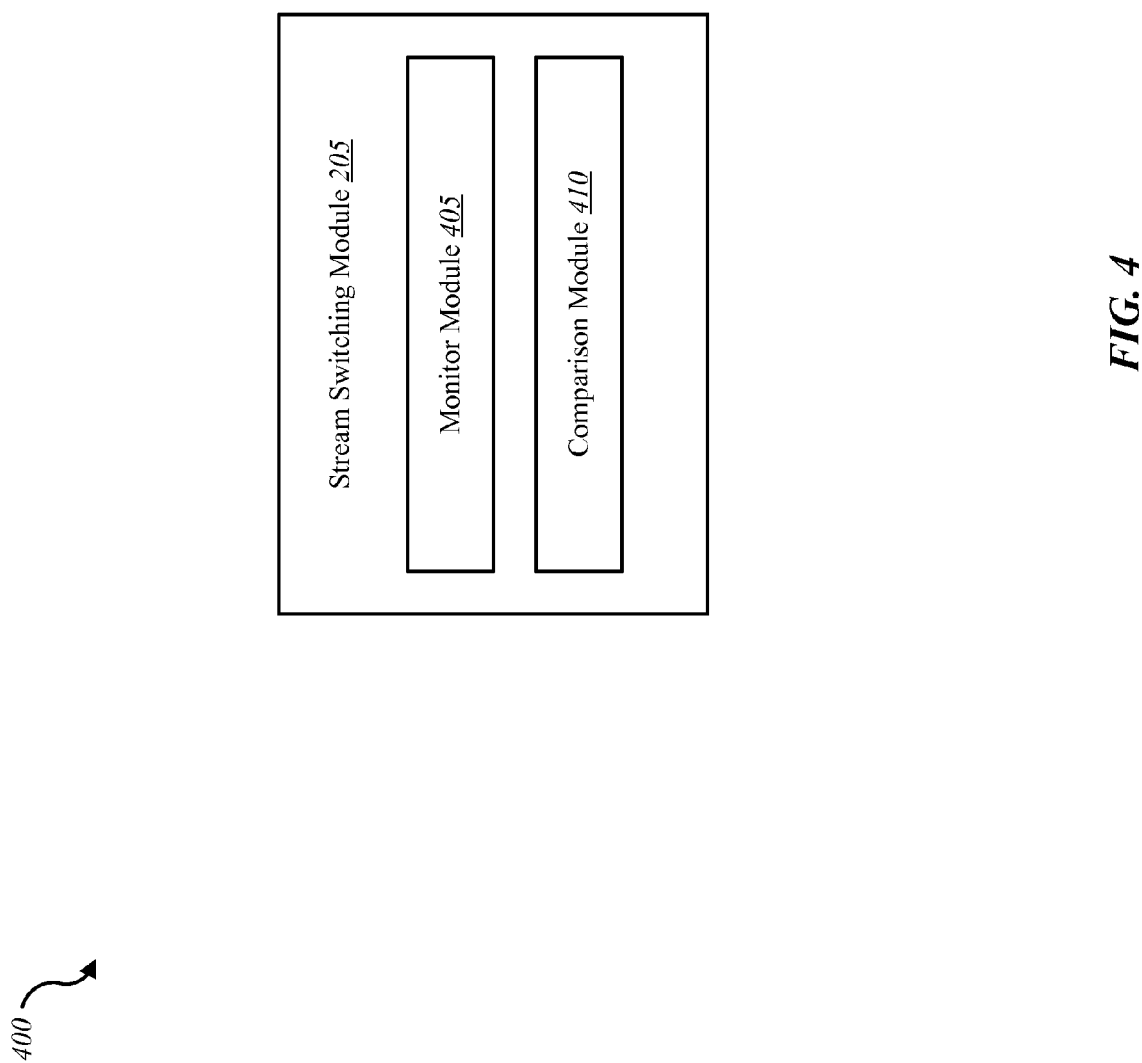
FIG. 4 depicts a block diagram illustrating one embodiment of a stream switching module that may be implemented with the present systems and methods.

FIG. 2 depicts a block diagram illustrating one embodiment of the server 110 that may be implemented with the present systems and methods. The server 110 may be an example of the server 110 shown in FIG. 1. The depicted server 110 includes a stream switching module 205. One example of the stream switching module 205 is shown in FIG. 4 and described in more detail below. Although the depicted server 110 is shown and described herein with certain components and functionality, other embodiments of the server 110 may be implemented with more or different components or with less or more functionality. For example, some embodiments of the server 110 include one or more networks and servers in addition to the depicted server 110. Additionally, some embodiments of the server 110 may include similar components arranged in another manner to provide similar functionality, in one or more aspects.

Figure 3:
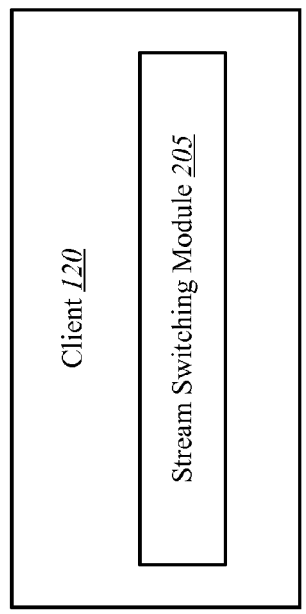
FIG. 3 depicts a block diagram illustrating one embodiment of a client that may be implemented with the present systems and methods.

FIG. 3 depicts a block diagram illustrating one embodiment of the client 120 that may be implemented with the present systems and methods. The client may be an example of the clients 120 shown in FIG. 1. The depicted client 120 includes one embodiment of the stream switching module 205. One example of the stream switching module 205 is shown in FIG. 4 and described in more detail below. Although the depicted client 120 is shown and described herein with certain components and functionality, other embodiments of the client 120 may be implemented with more or different components or with less or more functionality. For example, some embodiments of the client 120 include one or more networks and servers in addition to the depicted client 120. Additionally, some embodiments of the client 120 may include similar components arranged in another manner to provide similar functionality, in one or more aspects. In addition, the depicted client 120 may include one portion of the functionality of the stream switching module 205 while the depicted server 110 of FIG. 2 may include another portion of the functionality of the stream switching module 205.

FIG. 4 depicts a block diagram illustrating one embodiment of the stream switching module 205 that may be implemented with the present systems and methods. The stream switching module 205 includes a monitor module 405 and a comparison module 410. Although the depicted stream switching module 205 is shown and described herein with certain components and functionality, other embodiments of the stream switching module 205 may be implemented with more or different components or with less or more functionality. For example, some embodiments of the stream switching module 205 include one or more networks, clients, and servers in addition to the depicted stream switching module 205. Additionally, some embodiments of the stream switching module 205 may include similar components arranged in another manner to provide similar functionality, in one or more aspects.

In one embodiment, the source 105 provides statically-stored content to the server 110. The stream switching module 205 may scan through the stored content as to find the splicing points for stream switching. The stream switching module 205 may determine the speed at which a transmit streams is sent to the client 120. Alternatively, the source 105 provides data in a continuous real-time stream to the server 110. The stream switching module 205 may buffer the data briefly before transmitting it to client 120. The server 110 may provide a temporary storage buffer for each multimedia stream arriving from the source 105. A packet may remain within the buffer for a fixed duration of time. After this time expires, the packet may exit the buffer, and the stream switching module 205 may transmit the packet to the client 120. Packets may exit the buffer in the same order that they arrive. The stream switching module 205 may enclose each data packet in a timestamped envelope. The stream switching module 205 may consult the timestamps on the envelopes to determine when to retrieve packets from the buffer, and may discard the envelope before transmitting the data to the destination.

The stream switching module 205 may track the rate of data loss over a predefined period of time. In one embodiment, at least a portion of the data loss is based on FEC data. The stream switching module 205 may store historical data loss statistics in order to provide a clearer picture of data loss over an extended period of time, and to enable the stream switching module 205 to distinguish between a momentary loss of data and a persistent data loss condition. A persistently high rate of data loss may be an indicator that network or system capabilities are insufficient to allow reception of the volume of data being provided by the server 100. In this case, the stream switching module 205 may send a request to switch to a lower bit rate. When data loss is low or non-existent, this may be an indicator that network or system capabilities are more than sufficient to handle the current volume of data from the server 110. The stream switching module 205 may send a request to switch to a higher bit rate.

The stream switching module 205 may employ an algorithm to determine when to send a request to switch either to a higher bit rate data stream or a lower bit rate stream. The client 120 may consume the highest bit rate stream available that does not cause unacceptable levels of data loss. Data loss may be acceptable so long as it is within the ability of the FEC algorithm to recalculate lost data. The stream switching module 205 may calculate, based on the rate of data loss, a bit rate that generates data loss under a predefined threshold. The stream switching module 205 may incrementally switch to higher and higher bit rates until either the highest bit rate available is reached, or until a bit rate is reached that produces data loss above a predefined threshold. The stream switching module 205 may switch back down to the highest bit rate that produces data loss below the predefined threshold.

In one embodiment, the stream switching module 205 may send a start message to the server 110. The start message may include a request from the stream switching module 205 to the server 110. The request may include which multimedia channel to send to the client 120. The stream switching module 205 may request a multimedia channel, or stream, with a specific bit rate.

The stream switching module 205 may send a switch message to the server 110. The switch message may include a request to switch the client 120 to a different stream of the same content, but encoded with a different bit rate. In one embodiment, the stream switching module 205 makes the request relatively, e.g., a request to switch to a stream with the next "higher" bit rate or to the stream with the next "lower" bit rate. Alternatively, the stream switching module 205 may specify the bit rate. For example, the server 110 may provide the client 120 with a catalog of available streams of the same content, where each stream has a specified bit rate. Thus, the stream switching module 205 may send a switch message to the server 110 to switch from a first stream with a certain bit rate to a second stream with a different bit rate.

Upon receiving the switch message, the monitor module 405 may monitor the first stream that is currently transmitting to the client 120, as well as the second stream to which the client 120 requests to switch. The server 110 may receive both streams from one or more sources in addition to or in place of the source 105. The server 110 may process the first and second streams through buffers. When the client 120 has not begun to receive the second stream, the server 110 may discard packets from the second stream as those packets exit their associated buffer. The server 110 may delay transmitting packets from the second stream to the client 120 that requested it to ensure that the client 120 does not experience any discontinuity in playback.

In one embodiment, the source 105 may provide one or more alternate streams of the same content available on each multimedia channel. For example, the source 105 may set the bit rate of a first multimedia stream of certain content to 10 megabits per second (Mbps), a second multimedia stream of the same content to 2 Mbps, and a third multimedia stream of the same content to 1 Mbps. These alternate streams may have different actual bit rates in order to accommodate clients with different network limitations. For example, the 10 Mbps stream may be sent to client 120-a, the 2 Mbps stream to client 120-b, and the 1 Mbps stream to client 120-c. In one embodiment, the stream switching module 205 may merge client 120-b and 120-c on the same 10 Mbps stream as client 120-a. For example, when the content of a stream includes a high concentration of motion, such as a football game or other similar sports event, the channel may require the highest available bit rate in order to provide the highest quality experience for the end user viewing the content. Alternatively, when the clients 120 are ingesting the same 10 Mbps stream of a certain channel, the stream switching module 205 may split off client 120-c onto the 1 Mbps stream because the viewing device of client 120-c does not satisfy a predefined threshold. The stream switching module 205 may split or merge a client for other reasons as well including, but not limited to, the time of day, the type of content being streamed such as a sports event or a newscast, the actual bit rate of the content being streamed, etc.

The stream comparison module 410 may compare the timestamps of the splicing points of the packets emerging from the buffers of the first and second streams. Depending on the values of these timestamps, one of two different algorithms may be executed in order to perform the stream switch.

Figure 5:
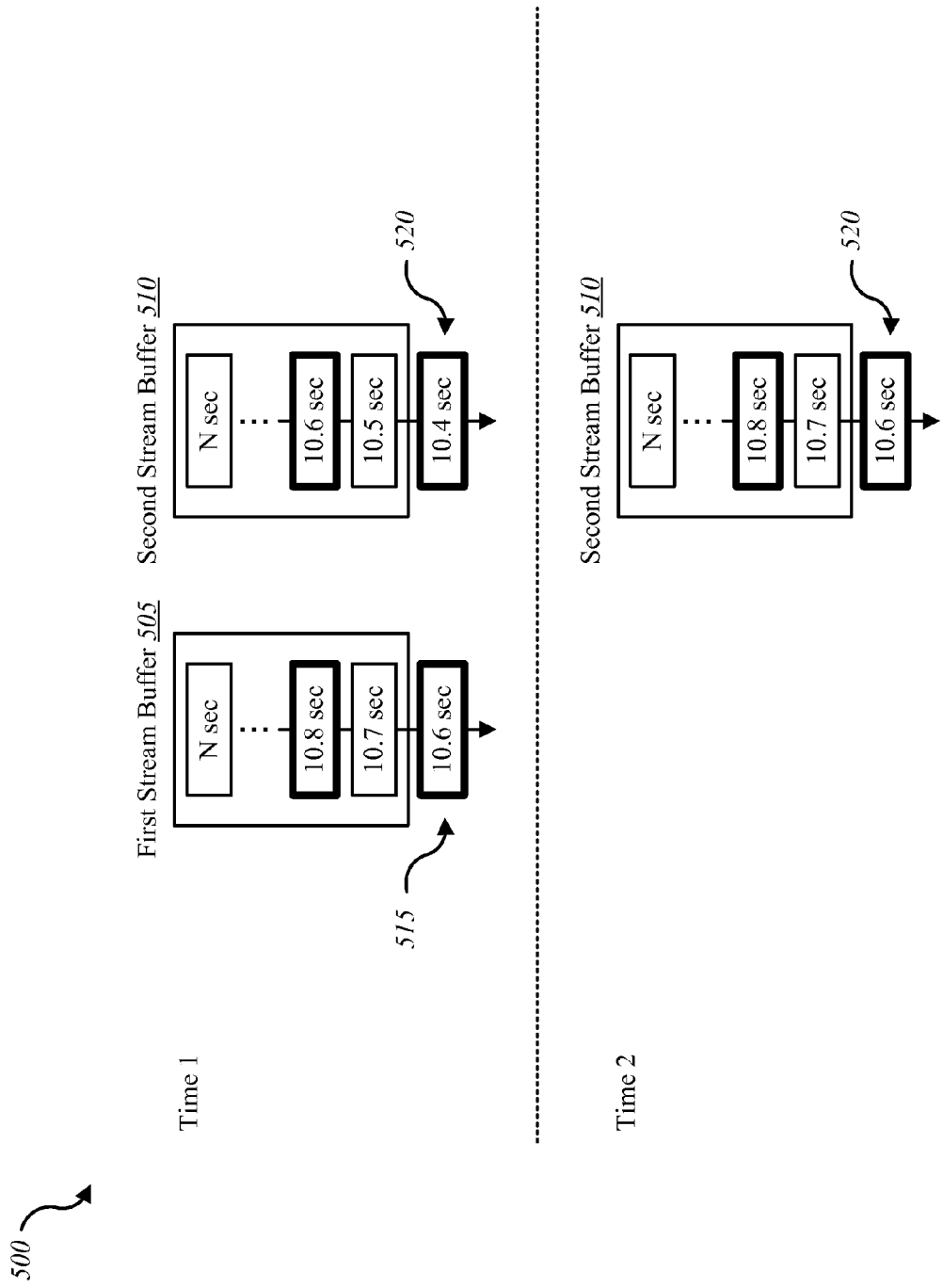
FIG. 5 depicts a block diagram illustrating one embodiment of a first stream buffer and a second stream buffer that may be implemented with the present systems and methods.

FIG. 5 depicts a block diagram illustrating one embodiment of a first stream buffer 505 and a second stream buffer 510 that may be implemented with the present systems and methods. The first stream buffer 505 includes a first stream 515 at "Time 1." The second stream buffer 510 includes a second stream 520 also at "Time 1." Additionally, the second stream 520 is depicted at "Time 2," a time that occurs later than "Time 1." At "Time 1," FIG. 5 depicts a packet emerging from the first stream buffer 505 with a time of 10.6 seconds, as well as a packet emerging from the second stream buffer 510 with a time of 10.4 seconds. Both of these packets are depicted with borders thicker than other depicted packets. The packets depicted with thicker borders are packets that are marked as splicing point packets. At "Time 1," both packets emerging from the first and second stream buffers 505 and 510 are marked as splicing point packets.

Algorithm A

At "Time 1," when the first stream 515 is ahead of the second stream 520 in time (i.e., the splicing points emerging from the first stream buffer 505 indicate timestamps later in time than the splicing points from emerging from the second stream buffer 510), then the stream switching module 205 may execute the following operations:

Stop transmitting data from the first stream buffer 505 before the next packet in the first stream 505 that is marked as a splicing point. In this case, the first stream buffer 505 stops transmitting before the packet in the first stream 515 with a timestamp of 10.6 seconds is transmitted.

Record the timestamp of this untransmitted splicing point packet from the first stream. In this case, the timestamp of 10.6 seconds is recorded.

Continue to process the second stream buffer 510 until a packet emerges from the second stream buffer 510 that has a splicing point with the same timestamp as the untransmitted splicing point from the first stream 515. In this case, the second stream buffer 510 continues processing until a splicing point packet with a value of 10.6 seconds emerges from the second stream buffer 510.

Begin transmitting data from the second stream buffer 510 to the client 120, beginning with the splicing point from the second stream 525 that matches the timestamp of the untransmitted splicing point from the first stream 515. In this case, the packet emerging from the second stream buffer 510 at "Time 2" matches the recorded timestamp of 10.6 seconds.

Figure 6:
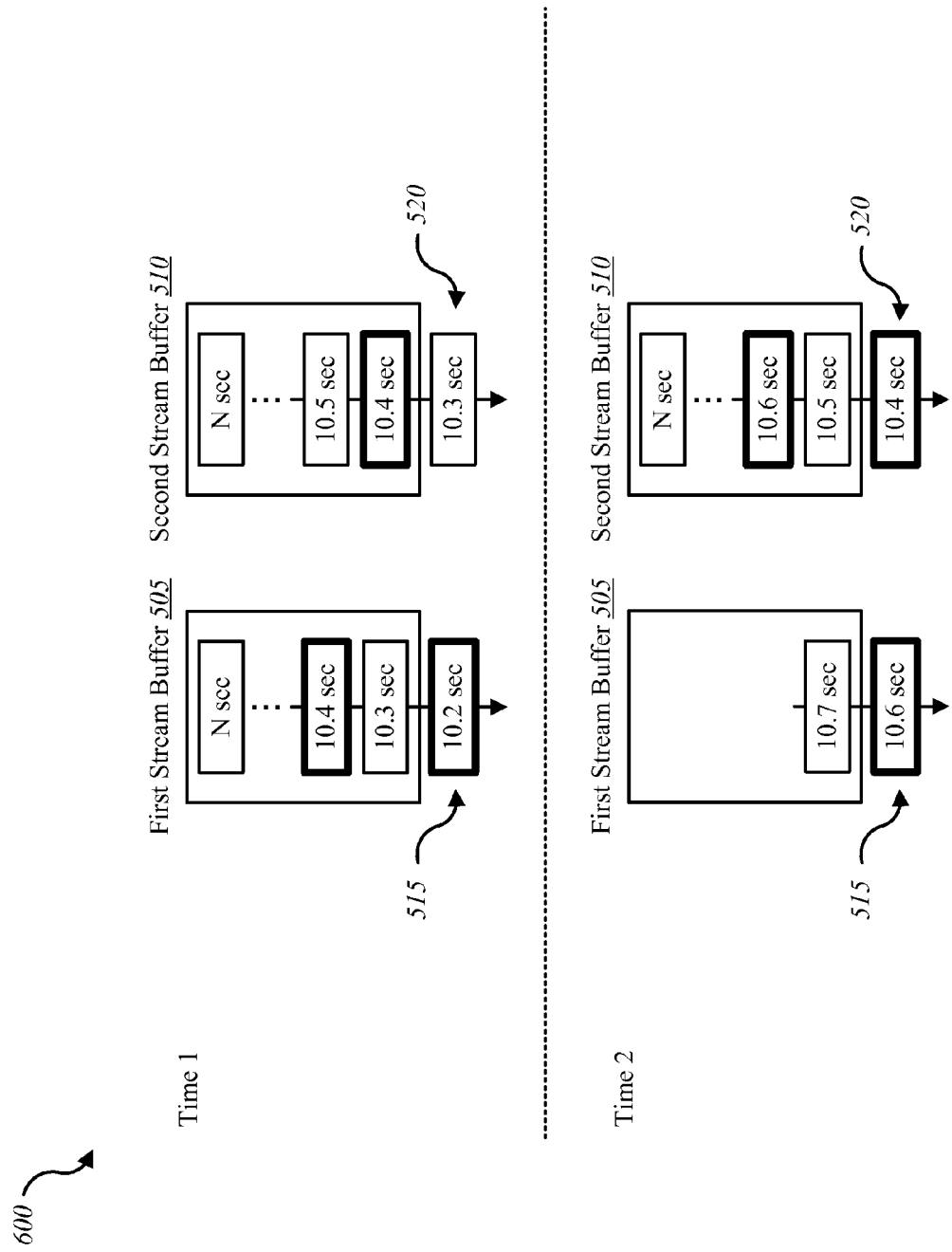
FIG. 6 depicts a block diagram illustrating another embodiment of the first stream buffer and the second stream buffer that may be implemented with the present systems and methods.

FIG. 6 depicts a block diagram illustrating one embodiment of the first stream buffer 505 and the second stream buffer 510 that may be implemented with the present systems and methods. The first stream buffer 505 includes the first stream 515 at "Time 1." The second stream buffer 510 includes the second stream 520 also at "Time 1." Additionally, the first stream 515 and second stream 520 are depicted at "Time 2," a time that occurs later than "Time 1." At "Time 1," a packet is depicted as emerging from the first stream buffer 505 with a time of 10.2 seconds, and another packet is depicted as emerging from the second stream buffer 510 with a time of 10.3 seconds. As in FIG. 5, packets depicted with thicker borders are packets that are marked as splicing point packets. At "Time 2," the first stream buffer 505 is depicted as being nearly empty.

Algorithm B

When the first stream 515 is behind the second stream 520 (i.e., the splicing points emerging from the first stream buffer 505 indicate timestamps earlier in time than the splicing points emerging from the second stream buffer 510), the stream switching module 205 may execute the following operations:

Begin pulling and transmitting packets from the first stream buffer 505 at a rate that is faster than would be dictated by the buffer timestamp envelopes, or at a data rate higher than the actual bit rate of the first stream 515. The client 120 may store the additional, accelerated data from the first stream in its own buffer.

At "Time 2," when the timestamps of the splicing points emerging from the first stream buffer 505 show a later time than the timestamps emerging from the second stream buffer 510, then execute Algorithm A, as described above.

When the stream switching module 205 transmits all packets from the first stream buffer 505, emptying the buffer, and the timestamps of the splicing points from the first stream buffer 505 are still behind the timestamps of the splicing points emerging from the second stream buffer 510, the stream switching module 205 may cancel the switch. The stream switching module 205 may attempt to make the switch at a later time. When the stream switching module 205 encounters a situation where the various alternate streams for one multimedia channel or program indicate a significant difference in timestamps, the stream switching module 205 may send an alert to a system operator.

In response to receiving a switch message from the client 120, the stream switching module 205 may send a warning message to the client 120. The warning message may notify the client 120 that the switch is pending. The warning message may include additional information related to the switch from the first stream to the second stream. For example, the warning message may contain information related to the location from which the second stream is sent such as the port address. The location of the stream to which the stream switching module 205 requests to switch may also include an identification value associated with the source 105 or the server 110. Additionally, the warning message may contain information related to the timing of the switch from the first stream to the second stream.

In addition to the warning message, the stream switching module 205 may mark the first packet sent to the client 120 from the second stream with a switching marker. The client 120 may receive the switching marker, the warning message, or both, as a notification to expect a discontinuity in the sequencing of packet numbers. Thus, in response to the switching marker, the warning message, or both, the stream switching module 205 does not interpret the discontinuity in sequence numbers as packet loss. In addition, the stream switching module 205 may delay performing FEC decoding until the next full FEC packet block from the second stream begins to avoid mixing packets from the first stream with the packets from the second stream in the FEC algorithm.

In one embodiment the stream switching module 205 may send a stop message to the server 110. The stop message may include a request to stop transmitting a stream. For example, a user of the client 120 may press a stop button on an interface associated with a currently transmitting stream. In response to the user pressing the stop button, the stream switching module 205 may send the stop message to the server 110. In response to receiving the stop message, the stream switching module 205 may stop the transmission of the currently transmitting stream.

The client 120 and the server 110 may exchange additional messages. For example, the stream switching module 205 may send the client 120 a list of all available bit rates associated with the current stream of content. Additionally, the stream switching module 205 may send the server 110 data that allows the server 110 or the client 120 to track data loss over a predefined span of time.

The effect of the stream switch is that the client 120 stops receiving data from the first stream with a first bit rate, and receives data from the second stream at a second bit rate, thus avoiding missing or duplicated multimedia data. The second stream may resume with the first multimedia packet of a video keyframe, resulting in no corruption or time-jumps that may result from switching streams at an arbitrary point.

Figure 7:
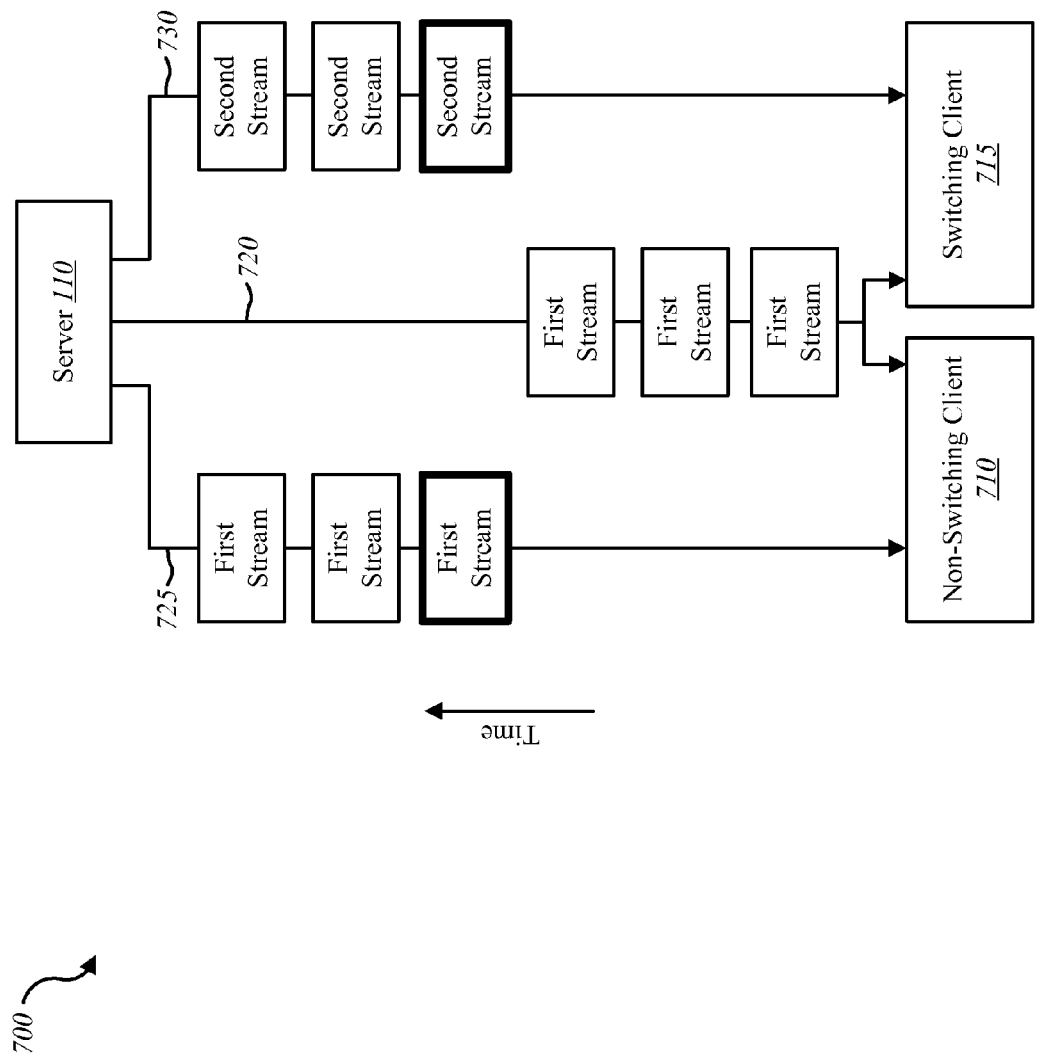
FIG. 7 depicts a block diagram illustrating one embodiment of a multicast stream switch process that may be implemented with the present systems and methods.

FIG. 7 depicts a block diagram illustrating one embodiment of a multicast stream switch process 700 that may be implemented with the present systems and methods. The multicast stream switch process 700 includes one embodiment of the server 110, a non-switching client 710, a switching client 715, an original first multicast stream 720, a subsequent first multicast stream 725, and a second multicast stream 730. Although the depicted multicast stream switch process 700 is shown and described herein with certain components and functionality, other embodiments of the multicast stream switch process 700 may be implemented with fewer or more components or with less or more functionality. For example, some embodiments of the multicast stream switch process 700 include one or more servers in addition to the depicted server 110. Additionally, some embodiments of the multicast stream switch process 700 may include one or more non-switching clients or switching clients in addition to those depicted. Additionally, some embodiments of the multicast stream switch process 700 may include similar components arranged in another manner to provide similar functionality, in one or more aspects.

In one embodiment, the stream switching module 205 may request to switch streams from a multicast address. For example, the server 110 transmits the original first multicast stream 720 to the non-switching client 710 and the switching client 715 from a first multicast address. In response to a request from the switching client 715 to switch to a second multicast stream, the server 110 stops the original first multicast stream 720 for the non-switching client 710 and the switching client 715. The last packet sent from the first multicast address must be the last packet from the original first multicast stream 720 prior to the time the switch is made. The server 110 begins transmitting two additional multicast streams, a subsequent first multicast stream 725 from a second multicast address for the switching client 715 that requested to switch to a new stream and a subsequent first multicast stream 725 from a third multicast address for the non-switching client 710 that continues to receive the same stream, but from a new multicast address. The first packet sent to both the second and third multicast addresses is a packet marked as a splicing point. The first packet sent from the second multicast address is the splicing point from the second multicast stream 730. The first packet sent from the third multicast address is the splicing point from the original first multicast stream 720.

In some cases, the first packet of the second multicast stream 730 may arrive at the switching client 715 before the last packet from the original first multicast stream 720. The stream switching module may transmit a warning message to the switching client 715 before the stream switch occurs. The warning message may notify the switching client 715 to store the stream data from the second multicast stream 730 and process it after the original first multicast stream 720 finishes. The server 110 ceases transmitting the original first multicast stream 720 at the first multicast address to notify the switching client 715 that a switch to the second multicast stream 730 at the second multicast address is pending. In the case of when the network packet with the switching marker is lost, the stream switching module 205 may interpret a complete halt of the original first multicast stream 720 on the first multicast address as a stream switching signal when the halt is accompanied by the stream switch warning message. In the case of a unicast stream, the server 110 may stop a first unicast stream that has a first bit rate and immediately start a second unicast stream with a second bit rate.

In one embodiment, the stream switching module 205 may request to switch streams from statically-stored content. When the server 110 retrieves statically-stored content from the source 105 and the server 110 receives a switch request, the stream switching module 205 may execute Algorithm A when the timestamps from the first stream are later in time than the timestamps from the second stream. When the timestamps the server 110 transmits from the first stream are earlier in time than the second stream, the server 110 may execute Algorithm B and may increase the rate of data consumption and transmission of the statically-stored content. Thus, the server 110 may transmit the first stream data at a rate above the actual bit rate.

In one embodiment, the client 120 may act as an intermediary between the server 110 and a playback device. In this case, the stream switching module 205 may process multimedia data from the server 110 and relay the processed data in an uninterrupted stream to the playback device. The intermediate client 120 in association with the stream switching module 205 may initiate a request to switch a stream in a process similar to the switching processes described above. The intermediate client 120 may process a request from the playback device. Alternatively, the intermediate client 120 may forward a request from the playback device to the server 110.

Figure 8:
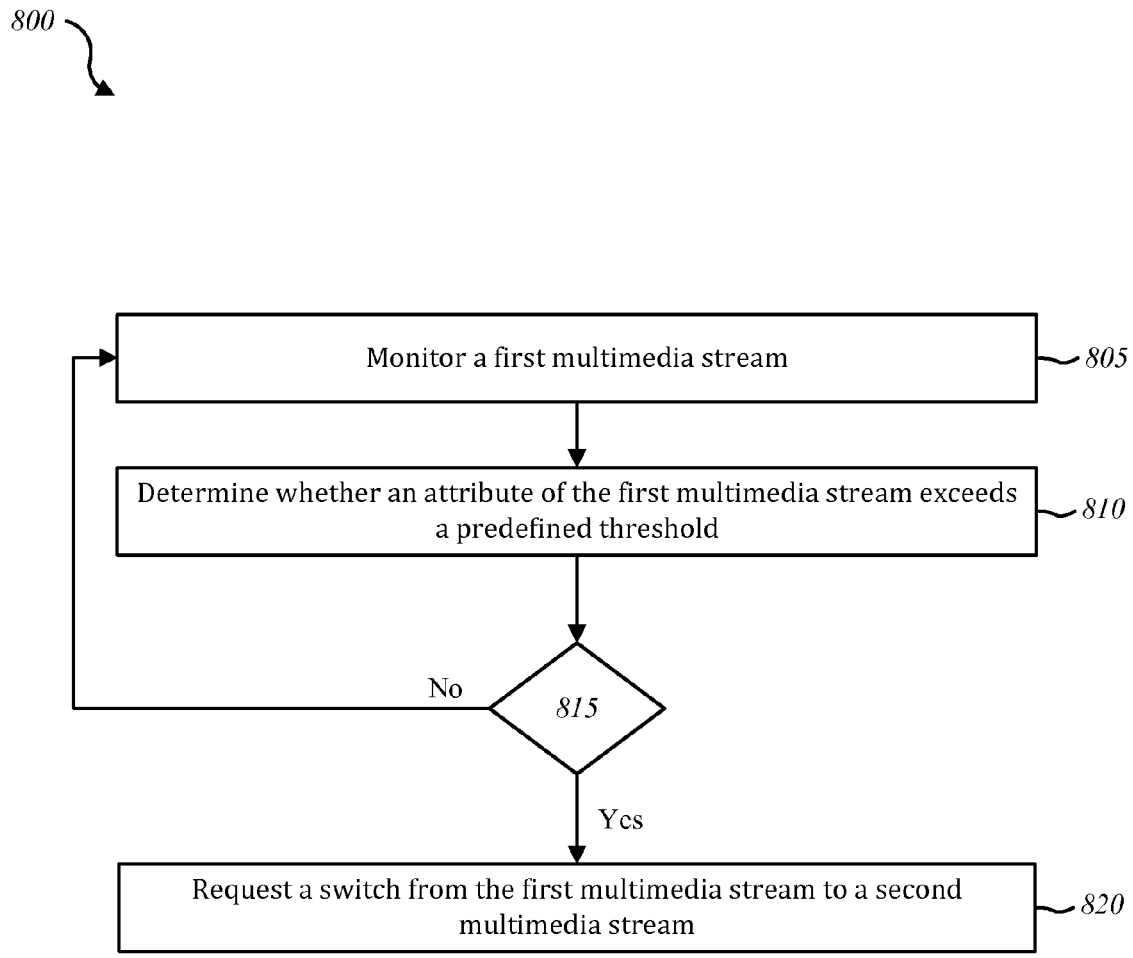
FIG. 8 is a flow diagram illustrating one embodiment of a method for switching between multimedia streams in real-time.

FIG. 8 is a flow diagram illustrating one embodiment of a method 800 for switching between multimedia streams in real-time. In one configuration, the method 800 may be implemented by the stream switching module 205. The multimedia streams may be audio/video content displayed on a display device of a computing device, such as the client 120.

In one example, the monitor module 405 may be configured to monitor 805 a first multimedia stream. The first multimedia stream may include multimedia content broadcasted in real-time from the source 105. In one embodiment, the comparison module 410 may determine 810 whether an attribute of the first multimedia stream satisfies a predefined threshold. In one example, the attribute includes a rate of data loss associated with the first multimedia stream. For example, the stream switching module 205 may detect a rate of data loss associated with the first multimedia stream. In response, the comparison module may compare 815 the detected rate of data loss to a predefined threshold of data loss. When the detected rate of data loss satisfies the predefined threshold of data loss, the stream switching module 205 may request 820 a switch from the first multimedia stream to a second multimedia stream. When the detected rate of data loss does not satisfy the predefined threshold of data loss, the stream switching module 205 may continue to monitor 805 the first multimedia stream. The term "satisfy" as used here may include a value that exceeds a threshold, fails to exceed a threshold, a value that meets a threshold, or a value that falls outside the range of a threshold.

Figure 9:
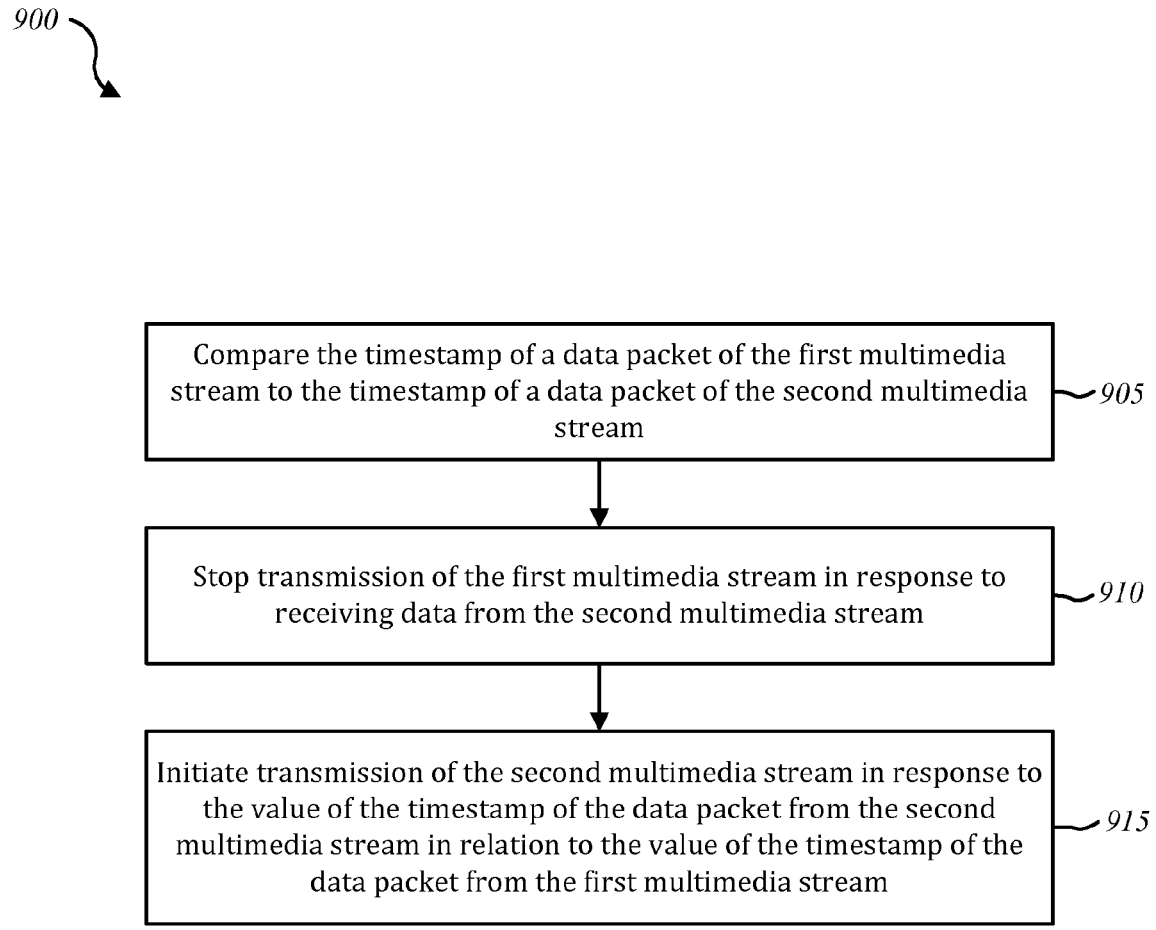
FIG. 9 is a flow diagram illustrating one embodiment of a method for initiating the transmission of a second multimedia stream.

FIG. 9 is a flow diagram illustrating one embodiment of a method 900 for initiating the transmission of a second multimedia stream. In one configuration, the method 900 may be implemented by the stream switching module 205. The second multimedia stream may include content that is delivered in a unicast stream and displayed on a display device of a computing device, such as the client 120.

In one example, the comparison module 410 may be configured to compare 905 the timestamp of a data packet of a first multimedia stream to the timestamp of a data packet of a second multimedia stream. The first multimedia stream may include statically-stored multimedia content on the source 105. Alternatively, the first multimedia stream may include real-time multicast content. In one embodiment, the stream switching module 205 may stop 910 transmission of the first multimedia stream in response to receiving data from the second multimedia stream. For example, the stream switching module 205 may stop the first multimedia stream when the detected rate of data loss of the first multimedia stream satisfies a predefined threshold of data loss. In response to the value of the timestamp of the data packet from the second multimedia stream in relation to the value of the timestamp of the data packet from the first multimedia stream, the stream switching module 205 may initiate 915 transmission of the second multimedia stream.

Figure 10:
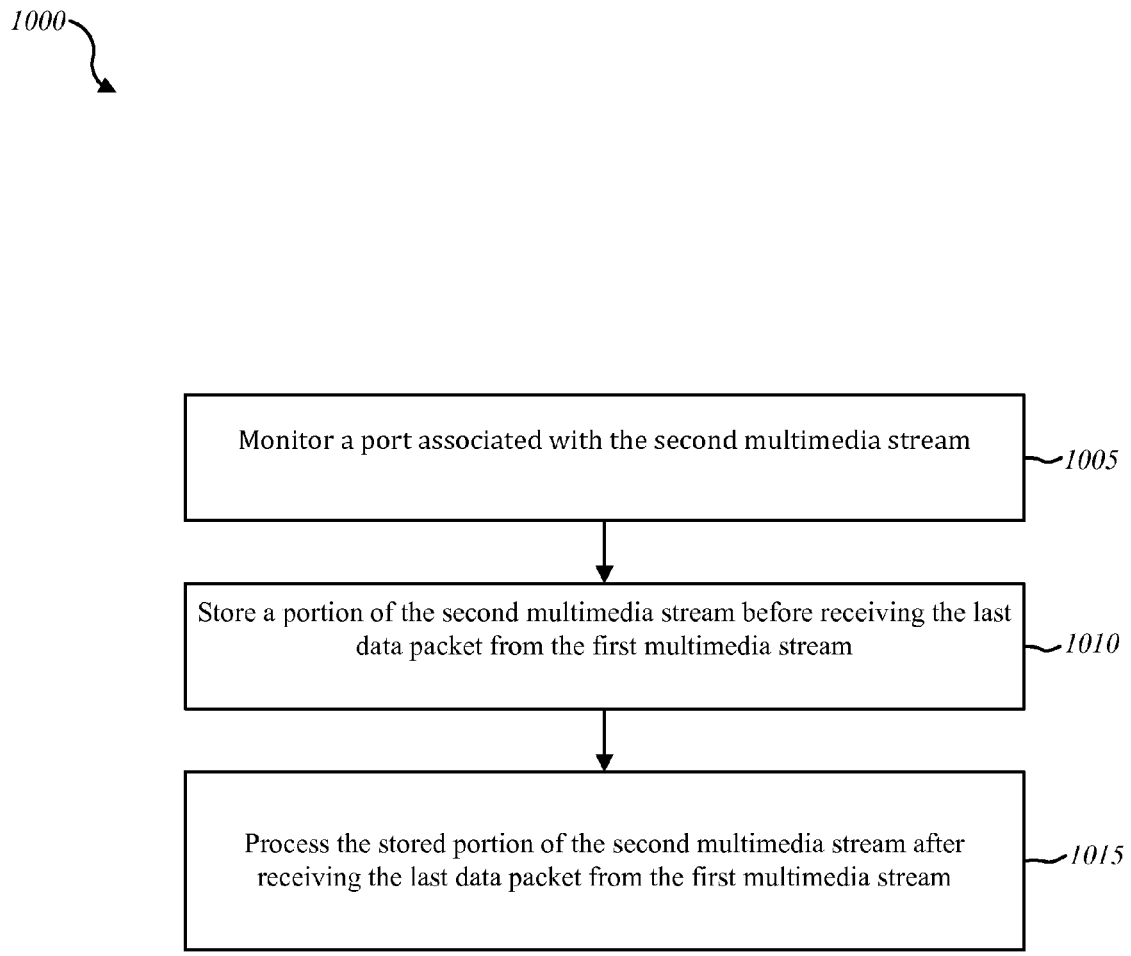
FIG. 10 is a flow diagram illustrating one embodiment of a method for processing a second multimedia stream.

FIG. 10 is a flow diagram illustrating one embodiment of a method 1000 for processing a second multimedia stream. In one configuration, the method 800 may be implemented by the stream switching module 205. The second multimedia stream may include content sent in a multicast stream that is displayed on a display device of a computing device, such as the client 120.

In one example, the monitor module 405 may be configured to monitor 1005 a port associated with the second multimedia stream. The second multimedia stream may include real-time multimedia content. In one embodiment, the stream switching module 205 may store 1010 a portion of the second multimedia stream before receiving the last data packet from the first multimedia stream. In one example, the portion of the second multimedia stream is stored temporarily in a buffer. After receiving the last data packet from the first multimedia stream, the stream switching module 205 may process 1015 the portion of the second multimedia stream that is stored.

Figure 11:
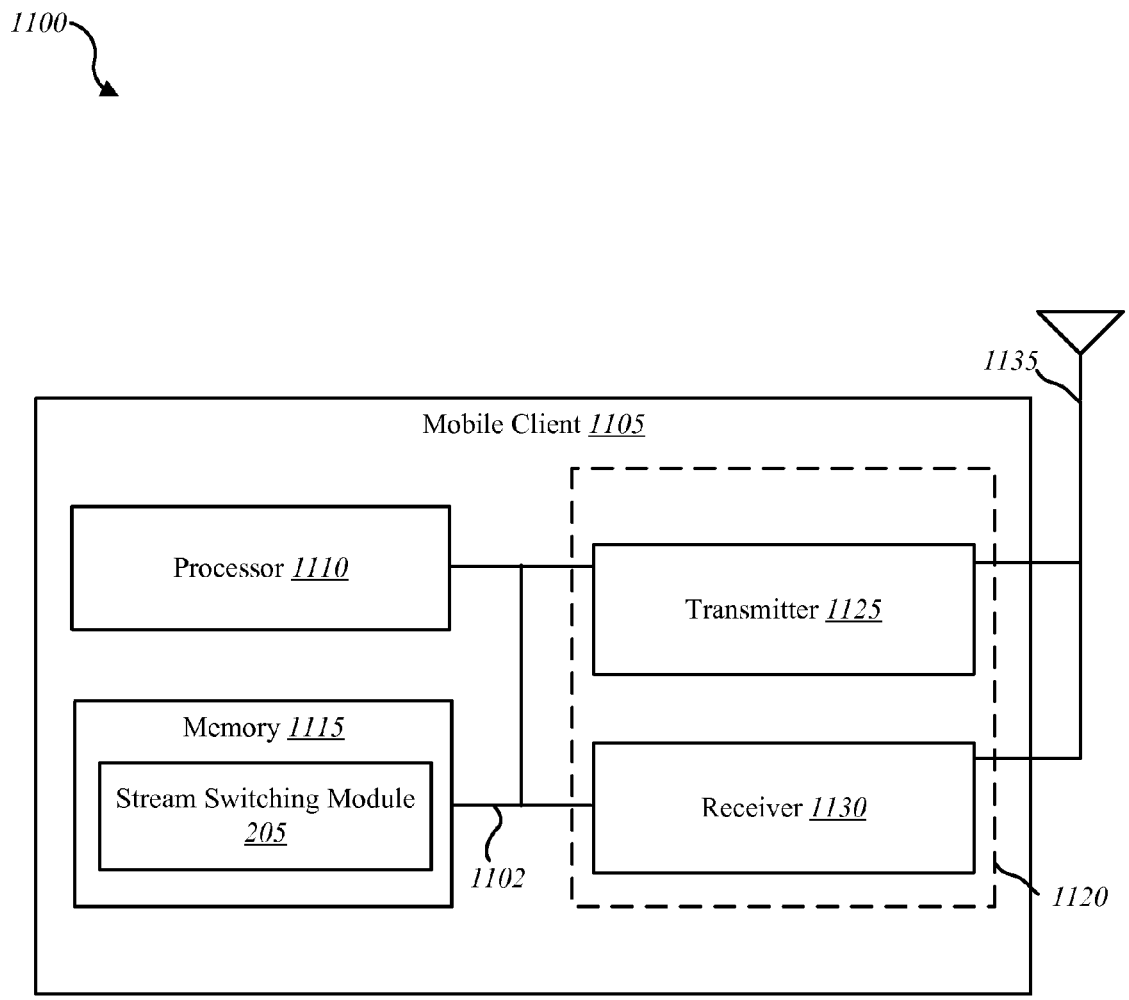
FIG. 11 depicts a block diagram illustrating one embodiment of a mobile client that may be implemented with the present systems and methods.

FIG. 11 depicts a block diagram illustrating one embodiment of a mobile client 1105 that may be implemented with the present systems and methods. The mobile client 1105 may be an example of the clients 120 shown in FIG. 1. The mobile client 1105 includes a bus 1130 which interconnects major subsystems of mobile client 1105, such as a central processor 1110, a system memory 1115 (typically RAM, but which may also include ROM, flash RAM, or the like), and a transceiver 1120 that includes a transmitter 1125, a receiver 1130, and an antenna 1135.

Bus 1102 allows data communication between central processor 1110 and system memory 1115, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the stream switching module 205 to implement the present systems and methods may be stored within the system memory 1115.

Applications resident with mobile client 1105 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Figure 12:
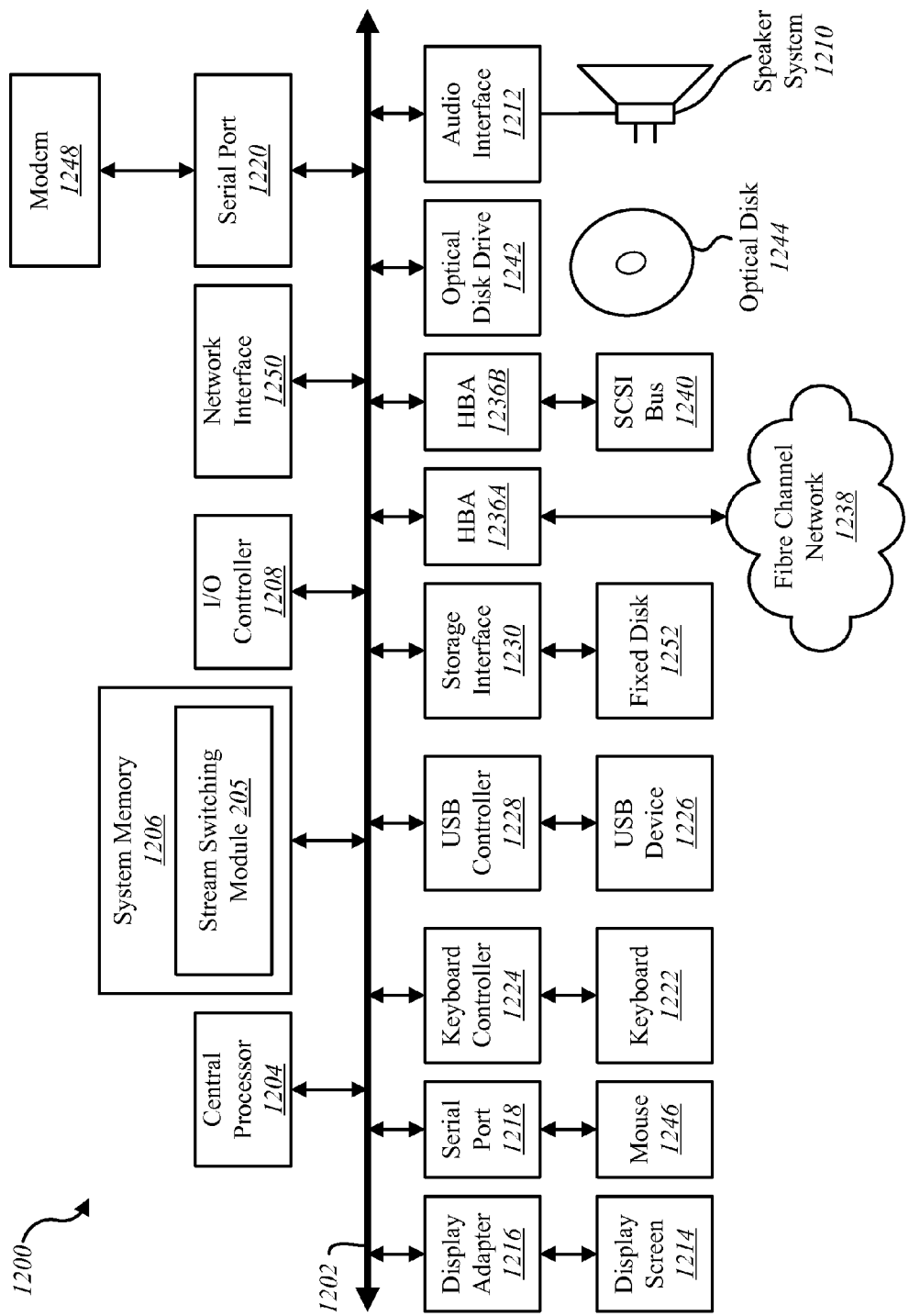
FIG. 12 depicts a block diagram of a computer system suitable for implementing the present systems and methods.

FIG. 12 depicts a block diagram of a computer system 1200 suitable for implementing the present systems and methods. Computer system 1200 includes a bus 1202 which interconnects major subsystems of computer system 1200, such as a central processor 1204, a system memory 1206 (typically RAM, but which may also include ROM, flash RAM, or the like), an input/output controller 1208, an external audio device, such as a speaker system 1210 via an audio output interface 1212, an external device, such as a display screen 1214 via display adapter 1216, serial ports 1218 and mouse 1220, a keyboard 1222 (interfaced with a keyboard controller 1224), multiple USB devices 1226 (interfaced with a USB controller 1228), a storage interface 1230, a host bus adapter (HBA) interface card 1236A operative to connect with a Fibre Channel network 1238, a host bus adapter (HBA) interface card 1236B operative to connect to a SCSI bus 1240, and an optical disk drive 1242 operative to receive an optical disk 1244. Also included are a mouse 1246 (or other point-and-click device, coupled to bus 1202 via serial port 1218), a modem 1248 (coupled to bus 1202 via serial port 1220), and a network interface 1250 (coupled directly to bus 1202).

Bus 1202 allows data communication between central processor 1204 and system memory 1206, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the stream switching module 205 to implement the present systems and methods may be stored within the system memory 1206. Applications resident with computer system 1200 are generally stored on and accessed via a non-transitory computer readable medium, such as a hard disk drive (e.g., fixed disk 1252), an optical drive (e.g., optical drive 1242), or other storage medium. Additionally, applications can be in the form of electronic signals modulated in accordance with the application and data communication technology when accessed via network modem 1248 or interface 1250.

Storage interface 1230, as with the other storage interfaces of computer system 1200, can connect to a standard computer readable medium for storage and/or retrieval of information, such as a fixed disk drive 1252. Fixed disk drive 1252 may be a part of computer system 1200 or may be separate and accessed through other interface systems. Modem 1248 may provide a direct connection to a remote server via a telephone link or to the Internet via an internet service provider (ISP). Network interface 1250 may provide a direct connection to a remote server via a direct network link to the Internet via a POP (point of presence). Network interface 1250 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present systems and methods. The devices and subsystems can be interconnected in different ways from that shown in FIG. 12. The operation of a computer system such as that shown in FIG. 12 is readily known in the art and is not discussed in detail in this application. Code to implement the present disclosure can be stored in a non-transitory computer-readable medium such as one or more of system memory 1206, fixed disk 1252, or optical disk 1244. The operating system provided on computer system 1200 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for switching between multimedia streams, the method comprising:
   monitoring a first multimedia stream;
   determining whether an attribute of the first multimedia stream satisfies a predefined threshold, wherein the attribute comprises a historical rate of data loss over a predetermined period of time;
   upon determining that the attribute of the first multimedia stream satisfied the predefined threshold, requesting a switch from the first multimedia stream to a second multimedia stream;
   upon receiving a data packet from the second multimedia stream, terminating transmission of the first multimedia stream, wherein the data packet from the second multimedia stream is marked as a splicing point; and
   upon determining a value of a timestamp of the data packet from the second multimedia stream in relation to a value of a timestamp of a data packet received from the first multimedia stream, initiating transmission of the second multimedia stream.

2. The method of claim 1, further comprising:
   comparing the timestamp of the data packet of the first multimedia stream to the timestamp of the data packet of the second multimedia stream.

3. The method of claim 1, further comprising:
   monitoring a port associated with the second multimedia stream;
   storing at least a portion of the second multimedia stream before receiving a last data packet from the first multimedia stream; and
   processing the at least a portion of the second multimedia stream after receiving the last data packet from the first multimedia stream.

4. The method of claim 1, further comprising:
   monitoring a synchronization level between the first and second multimedia streams; and
   upon determining that the synchronization level satisfied a predefined synchronization threshold, sending an alert.

5. The method of claim 1, further comprising:
   storing historical data loss statistics; and
   determining a type of data loss based at least in part on the stored historical data loss statistics.

6. The method of claim 1, further comprising:
   upon receiving the request to switch from the first multimedia stream to the second multimedia stream, sending a warning message.

7. The method of claim 1, further comprising:
   sending the first multimedia stream to a first client;
   sending the second multimedia stream to a second client;
   switching the second client from the second multimedia stream to the first multimedia stream consumed by the first client; and
   upon determining the second client is switched to the first multimedia stream, terminating the second multimedia stream.

8. The method of claim 1, further comprising:
   sending the first multimedia stream to both a first client and to a second client; and
   upon determining that an attribute of the first multimedia stream satisfies a predefined splitting threshold, switching the second client to the second multimedia stream.

9. The method of claim 1, further comprising:
   transmitting one or more data packets from the first multimedia stream at a first data rate, the first data rate being higher than an actual data rate of the first multimedia stream.

10. A computing device configured to switch between multimedia streams, comprising:
    a processor;
    memory in electronic communication with the processor;
    instructions stored in the memory, the instructions being executable by the processor to:
    monitor a first multimedia stream;
    determine whether an attribute of the first multimedia stream satisfies a predefined threshold, wherein the attribute comprises a historical rate of data loss over a predetermined period of time;
    upon determining that the attribute of the first multimedia stream satisfied the predefined threshold, request a switch from the first multimedia stream to a second multimedia stream;
    upon receiving a data packet from the second multimedia stream, terminate transmission of the first multimedia stream, wherein the data packet from the second multimedia stream is marked as a splicing point; and
    upon determining a value of a timestamp of the data packet from the second multimedia stream in relation to a value of the timestamp of a data packet from the first multimedia stream, initiate transmission of the second multimedia stream.

11. The computing device of claim 10, wherein the instructions are further executable by the processor to:
    compare the timestamp of the data packet of the first multimedia stream to the timestamp of the data packet of the second multimedia stream.

12. The computing device of claim 10, wherein the instructions are further executable by the processor to:
    monitor a port associated with the second multimedia stream;
    store at least a portion of the second multimedia stream before receiving a last data packet from the first multimedia stream; and
    process the at least a portion of the second multimedia stream after receiving the last data packet from the first multimedia stream.

13. The computing device of claim 10, wherein the instructions are further executable by the processor to:
    monitor a synchronization level between the first and second multimedia streams; and
    upon determining that the synchronization level satisfied a predefined synchronization threshold, send an alert.

14. The computing device of claim 10, wherein the instructions are further executable by the processor to:

store historical data loss statistics; and
determine a type of data loss based at least in part on the stored historical data loss statistics.

15. The computing device of claim 10, wherein, upon receiving the request to switch from the first multimedia stream to the second multimedia stream, the instructions are further executable by the processor to:
send a warning message.

16. The computing device of claim 10, wherein the instructions are further executable by the processor to:
send the first multimedia stream to a first client;
send the second multimedia stream to a second client;
switch the second client consuming the second multimedia stream from the second multimedia stream to the first multimedia stream consumed by the first client; and
upon determining the second client is switched to the first multimedia stream, terminate the second multimedia stream.

17. The computing device of claim 10, wherein the instructions are further executable by the processor to:
send the first multimedia stream to both the first client and to the second client; and
upon determining that an attribute of the first multimedia stream satisfies a predefined splitting threshold, switch the second client to the second multimedia stream.

18. The computing device of claim 10, wherein the instructions are further executable by the processor to:
transmit one or more data packets from the first multimedia stream at a first data rate, the first data rate being higher than an actual data rate of the first multimedia stream.

19. A computer-program product for switching between multimedia streams, the computer-program product comprising a non-transitory computer-readable medium storing instructions thereon, the instructions being executable by a processor to:
monitor a first multimedia stream;
determine whether an attribute of the first multimedia stream satisfies a predefined threshold, wherein the attribute comprises a historical rate of data loss over a predetermined period of time;
upon determining that the attribute of the first multimedia stream satisfied the predefined threshold, request a switch from the first multimedia stream to a second multimedia stream;
upon receiving a data packet from the second multimedia stream, terminating transmission of the first multimedia stream, wherein the data packet from the second multimedia stream is marked as a splicing point; and
upon determining a value of a timestamp of the data packet from the second multimedia stream in relation to a value of a timestamp of a data packet from the first multimedia stream, initiating transmission of the second multimedia stream.

20. The computer-program product of claim 19, wherein the instructions are further executable by the processor to:
compare the timestamp of the data packet of the first multimedia stream to the timestamp of the data packet of the second multimedia stream.

21. The computer-program product of claim 19, wherein the instructions are further executable by the processor to:
monitor a port associated with the second multimedia stream;
store at least a portion of the second multimedia stream before receiving a last data packet from the first multimedia stream; and
process the at least a portion of the second multimedia stream after receiving the last data packet from the first multimedia stream.

22. The computer-program product of claim 19, wherein the instructions are further executable by the processor to:
monitor a synchronization level between the first and second multimedia streams; and
upon determining that the synchronization level satisfied a predefined synchronization threshold, send an alert.

* * * * *